US012375421B2

(12) United States Patent
Nevrekar et al.

(10) Patent No.: US 12,375,421 B2
(45) Date of Patent: *Jul. 29, 2025

(54) METADATA EXTRACTION BASED ON RESOURCE ATTRIBUTES AND USER-DEFINED POLICY AND TOPOLOGY

(71) Applicant: Microsoft Technology Licensing, LLC, Redmond, WA (US)

(72) Inventors: Narayan Nevrekar, Sammamish, WA (US); Vishal Kumar Seshagirirao Anil, Redmond, WA (US); Justin R. Dellamore, Lynnwood, WA (US); Heriknaz Vermishyan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,291

(22) Filed: May 5, 2024

(65) Prior Publication Data

US 2024/0291771 A1    Aug. 29, 2024

Related U.S. Application Data

(63) Continuation of application No. 17/125,192, filed on Dec. 7, 2020, now Pat. No. 12,010,036.
(Continued)

(51) Int. Cl.
*H04L 47/78* (2022.01)
*H04L 67/1087* (2022.01)
*H04L 67/561* (2022.01)

(52) U.S. Cl.
CPC .......... *H04L 47/782* (2013.01); *H04L 47/781* (2013.01); *H04L 67/1089* (2013.01); *H04L 67/561* (2022.05)

(58) Field of Classification Search
CPC .. H04L 47/782; H04L 67/561; H04L 67/1089
See application file for complete search history.

(56) References Cited

U.S. PATENT DOCUMENTS 8,180,758 B1 * 5/2012 Cornali ................... G06F 16/28
707/707
2018/0165375 A1 * 6/2018 Silkey ................... G06F 16/258
(Continued)

*Primary Examiner* — Nam T Tran
(74) *Attorney, Agent, or Firm* — Wade IP Law PLLC

(57) ABSTRACT

Techniques are described herein that are capable of performing metadata extraction based on resource attributes and user-defined policy and topology. A hierarchical resource-grouping construct, which is selected from hierarchical resource-grouping constructs in a user-defined hierarchical resource-grouping topology of a cloud computing service account, is registered by enumerating at least a subset of the constructs. The subset includes the selected construct and each other construct encompassed by the selected construct. Metadata is selectively extracted from the constructs that are included in the subset to provide extracted metadata based at least in part on one or more user-defined policies, which are assigned among the constructs that are included in the subset, indicating whether the metadata is to be extracted as a result of resources associated with the constructs included in the subset having specified attributes. A searchable catalog is generated that includes the extracted metadata.

20 Claims, 8 Drawing Sheets

Related U.S. Application Data

(60) Provisional application No. 63/121,231, filed on Dec. 3, 2020.

(56) References Cited

U.S. PATENT DOCUMENTS

| | | | |
|---|---|---|---|
| 2018/0336228 A1* | 11/2018 | Krog Iverson | G06F 16/258 |
| 2019/0018870 A1* | 1/2019 | Bhagwat | G06F 16/256 |

* cited by examiner

METADATA EXTRACTION BASED ON RESOURCE ATTRIBUTES AND USER-DEFINED POLICY AND TOPOLOGY

CROSS-REFERENCE TO RELATED APPLICATION(S)

This application is a continuation of U.S. patent application Ser. No. 17/125,192, filed Dec. 17, 2020 and entitled "Metadata Extraction Based on Resource Attributes and User-Defined Policy and Topology," which claims the benefit of U.S. Provisional Application No. 63/121,231, filed Dec. 3, 2020 and entitled "Metadata Extraction Based on Resource Attributes and User-Defined Policy and Topology," the entireties of which are incorporated herein by reference.

BACKGROUND

Users of computing devices are increasingly transferring their data to "the cloud," especially in enterprise environments. The cloud is a network of servers. In many instances, the cloud is a global network of remote servers that operate as a single ecosystem. One benefit of transferring data to the cloud is the theoretically infinite scale that the cloud provides. As users scale up their data in the cloud, they typically seek an efficient way to govern the data at scale. Conventional techniques to govern data in the cloud often utilize metadata associated with the data. The metadata may be scanned into a catalog, which may be searched by the users to identify desired data. However, the conventional techniques typically do not support scanning at a high scale.

Users traditionally harvest metadata from all of the different data fabrics and types they have within the cloud by performing manual operations, such as explicitly applying permissions and setting up harvesting configurations on each resource split by type, and monitor such operations separately to track failure and iterate. Such manual operations often become cumbersome and error-prone due to the scale at which cloud resources operate. Due to this challenge, information technology (IT) administrators in an organization may avoid bringing their data fabrics under governance, which can have a detrimental impact on privacy compliance and standards and can consequently have a negative economic impact in terms of fines and penalties for the organization.

SUMMARY

Various approaches are described herein for, among other things, performing metadata extraction based on resource attributes and user-defined policy and topology. For instance, the resource attributes may be associated with hierarchical resource-grouping constructs in a user-defined hierarchical resource-grouping topology of a cloud computing service account. Metadata extraction is the act of gathering metadata associated with at least one resource. Examples of a resource include but are not limited to a SQL server, a Microsoft® Azure® data lake, and an Amazon® AWS® S3 bucket. User-defined policy based metadata extraction is metadata extraction that is based on (e.g., based at least in part on) at least one user-defined policy. A user-defined policy is a policy that is defined (e.g., created) by a user of a cloud computing service (e.g., a user of the cloud computing service account). An attribute of a resource indicates (e.g., specifies) information about the resource. Examples of an attribute of a resource include but are not limited to metadata (e.g., a tag or a timestamp) associated with the resource, a name of the resource, a credential that is usable to obtain access to the resource, a type of the resource, a time instance at which the resource was most recently scanned, and a proportion of the resource that was scanned during the most recent scan of the resource.

A cloud computing service account is an account of a cloud computing service. A cloud computing service is a service that executes at least in part in the cloud. The cloud may be a remote cloud, an on-premises cloud, or a hybrid cloud. It will be recognized that an on-premises cloud may use remote cloud services. A hierarchical resource-grouping topology of a cloud computing service account is a hierarchical categorization of resources that are associated with (e.g., available for use in the context of) the cloud computing service account. The hierarchical resource-grouping topology includes multiple hierarchical resource-grouping constructs, which represent respective hierarchical categorizations of the resources. A lowest hierarchical resource-grouping construct is encompassed by a next higher hierarchical resource-grouping construct, which is encompassed by a next higher hierarchical resource-grouping construct, and so on. Accordingly, each hierarchical resource-grouping construct encompasses all hierarchical resource-grouping constructs that are below the respective resource-grouping construct in the hierarchical resource-grouping topology. A user-defined hierarchical resource-grouping topology of the cloud computing service account is a hierarchical resource-grouping topology that is defined by a user of the cloud computing service (e.g., a user of the cloud computing service account). The cloud computing service account is an account of the cloud computing service.

In an example approach of performing metadata extraction based on resource attributes and user-defined policy and topology, a hierarchical resource-grouping construct, which is selected from multiple hierarchical resource-grouping constructs in a user-defined hierarchical resource-grouping topology of a cloud computing service account, is registered by enumerating at least a subset of the hierarchical resource-grouping constructs. The subset of the hierarchical resource-grouping constructs includes the selected hierarchical resource-grouping construct and each other hierarchical resource-grouping construct that is encompassed by the selected hierarchical resource-grouping construct. Metadata is selectively extracted from the hierarchical resource-grouping constructs that are included in the subset to provide extracted metadata based at least in part on one or more user-defined policies, which are assigned among the hierarchical resource-grouping constructs that are included in the subset, indicating whether the metadata is to be extracted as a result of resources that are associated with the hierarchical resource-grouping constructs that are included in the subset having specified attributes. A searchable catalog is generated that includes the extracted metadata.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
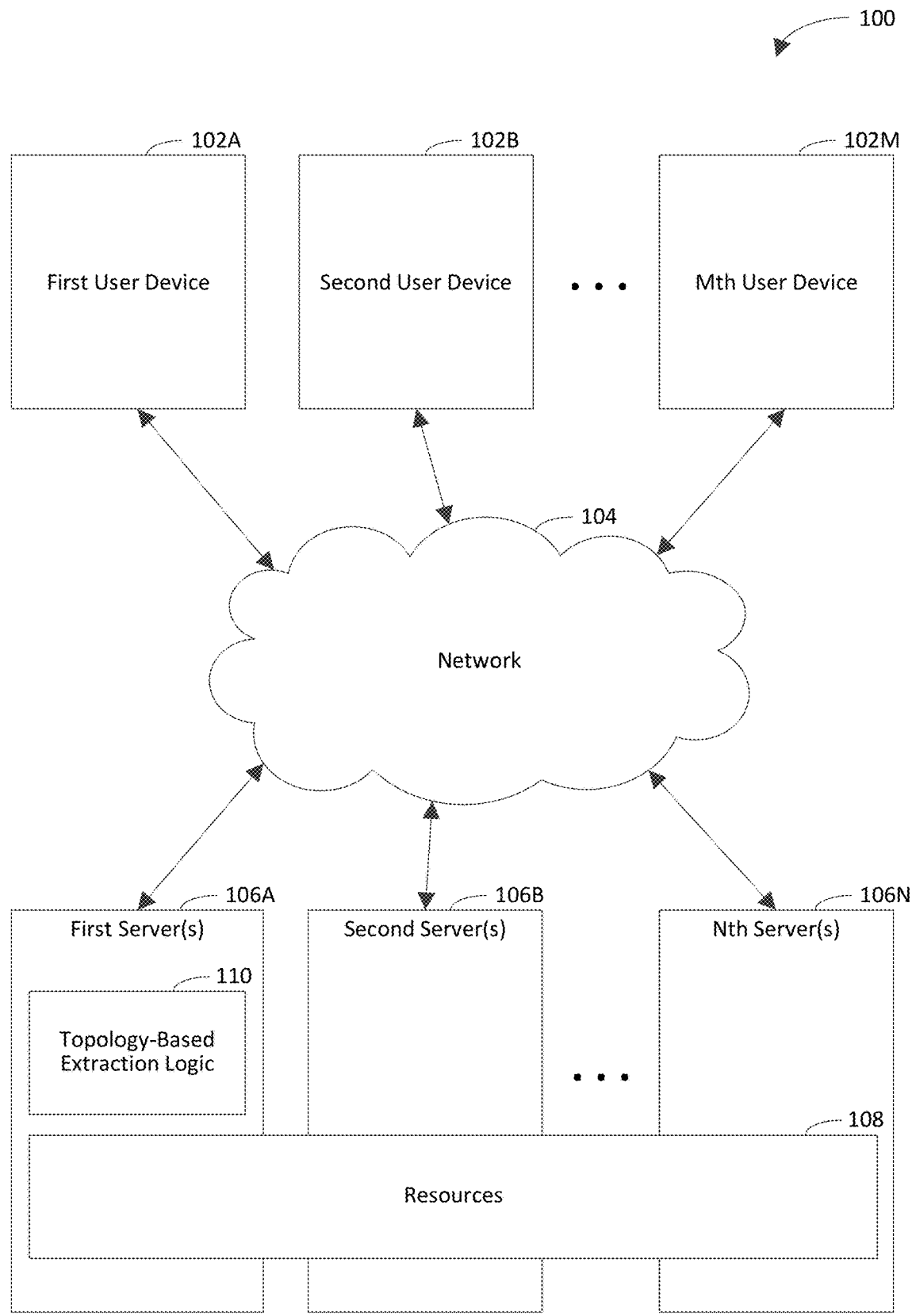
FIG. 1 is a block diagram of an example topology-based extraction system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of performing metadata extraction based on resource attributes and user-defined policy and topology. For instance, the resource attributes may be associated with hierarchical resource-grouping constructs in a user-defined hierarchical resource-grouping topology of a cloud computing service account. Metadata extraction is the act of gathering metadata associated with at least one resource. Examples of a resource include but are not limited to a SQL server, a Microsoft® Azure® data lake, and an Amazon® AWS® S3 bucket. User-defined policy based metadata extraction is metadata extraction that is based on (e.g., based at least in part on) at least one user-defined policy. A user-defined policy is a policy that is defined (e.g., created) by a user of a cloud computing service (e.g., a user of the cloud computing service account). An attribute of a resource indicates (e.g., specifies) information about the resource. Examples of an attribute of a resource include but are not limited to metadata (e.g., a tag or a timestamp) associated with the resource, a name of the resource, an environment of the resource (e.g., production, test, or confidential), a credential that is usable to obtain access to the resource, a type of the resource, a time instance at which the resource was most recently scanned, and a proportion of the resource that was scanned during the most recent scan of the resource.

A cloud computing service account is an account of a cloud computing service. A cloud computing service is a service that executes at least in part in the cloud. The cloud may be a remote cloud, an on-premises cloud, or a hybrid cloud. It will be recognized that an on-premises cloud may use remote cloud services. A hierarchical resource-grouping topology of a cloud computing service account is a hierarchical categorization of resources that are associated with (e.g., available for use in the context of) the cloud computing service account. The hierarchical resource-grouping topology includes multiple hierarchical resource-grouping constructs, which represent respective hierarchical categorizations of the resources. A lowest hierarchical resource-grouping construct is encompassed by a next higher hierarchical resource-grouping construct, which is encompassed by a next higher hierarchical resource-grouping construct, and so on. Accordingly, each hierarchical resource-grouping construct encompasses all hierarchical resource-grouping constructs that are below the respective resource-grouping construct in the hierarchical resource-grouping topology. A user-defined hierarchical resource-grouping topology of the cloud computing service account is a hierarchical resource-grouping topology that is defined by a user of the cloud computing service (e.g., a user of the cloud computing service account). The cloud computing service account is an account of the cloud computing service.

Example techniques described herein have a variety of benefits as compared to conventional techniques for extracting metadata. For instance, the example techniques may be capable of automating and/or simplifying metadata extraction. For example, the metadata extraction may be automated based on a user-defined hierarchical resource-grouping topology of a cloud computing service account and one or more user-defined policies that are assigned among a subset of hierarchical resource-grouping constructs that are included in the user-defined hierarchical resource-grouping topology. The example techniques may simplify metadata extraction by eliminating manual operations that characterize many conventional metadata extraction techniques. For instance, by automating configuration of resources in the hierarchical resource-grouping topology, the example techniques may eliminate the need for a user to explicitly configure each of the resources for metadata extraction. The user may register a selected hierarchical resource-grouping construct in the hierarchical resource-grouping topology with at least one policy, and the example techniques may be capable of performing the metadata extraction for the selected hierarchical resource-grouping construct and each other hierarchical resource-grouping construct that is encompassed by the selected hierarchical resource-grouping construct based on (e.g., based at least in part on) the at least one policy. The example techniques may increase accuracy of metadata extraction by reducing a number of errors, such as those that are attributable to manual (i.e., human) intervention in the metadata extraction process. For instance, the example techniques may eliminate human error in the metadata extraction process. The example techniques may be driven entirely by policy and configuration, rather than by human action. The example techniques may perform the metadata extraction based on attributes of resources, including data assets of the resources. Examples of a data asset include but are not limited to a file and a database entry.

The example techniques may facilitate visualization of a hierarchy of the resources that are available for use in an account of a cloud computing service and aggregated statistics from scan and policy bindings within the account. The example techniques may increase security of the cloud computing service and/or computing systems that interact with the cloud computing service by bringing the resources under governance. The example techniques may provide greater security of a computing system than conventional techniques that extract metadata because the example techniques may be capable of extracting metadata more quickly, efficiently, and/or accurately than the conventional techniques. The example techniques may reduce a cost associated with governing the resources, for example, by avoiding fines and penalties associated with failure to govern the resources.

The example techniques may reduce an amount of time and/or resources (e.g., processor cycles, memory, network bandwidth) that is consumed to extract metadata. For instance, by utilizing a user-defined hierarchical resource-grouping topology and one or more user-defined policies to extract metadata based on attributes of resources, the time and resources associated with manually applying permissions, manually setting up harvesting configurations, and manual monitoring such operations may be avoided. The example techniques may thereby reduce a cost associated with extracting metadata, for example, by not incurring a cost that is attributable to each such manual operation. The example techniques may increase efficiency of a computing system that is used to extract the metadata. The example techniques may increase efficiency of a user of a computing system that governs resources and/or extracts metadata associated with the resources, for example, by streamlining setup at scale, management and monitoring of the metadata extraction process, and application of policies (e.g., access policies, classification policies, and scan policies).

FIG. 1 is a block diagram of an example topology-based extraction system 100 in accordance with an embodiment. Generally speaking, the topology-based extraction system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the topology-based extraction system 100 performs metadata extraction based on attributes of resources 108 and user-defined policy and topology. Detail regarding techniques for performing such user-defined policy based metadata extraction is provided in the following discussion.

As shown in FIG. 1, the topology-based extraction system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Each of the computer programs may be referred to as a cloud-based service. A cloud-based service is a service (e.g., application) that is hosted on one or more servers (e.g., one or more of the servers 106A-106N). Accordingly, the cloud-based service may execute at least partially (e.g., entirely) on the server(s), which may operate as a single networked ecosystem. In accordance with some example embodiments, the servers 106A-106N are configured to host respective Web sites, so that the Web sites are accessible to users of the topology-based extraction system 100.

The resources 108 are hosted by one or more of the servers 106A-106N. The resources 108 are shown to be distributed across the servers 106A-106N for illustrative purposes and are not intended to be limiting. Each of the servers 106A-106N may host any suitable portion (e.g., none, all, or a fraction) of the resources 108.

The first server(s) 106A are shown to include topology-based extraction logic 110 for illustrative purposes. The topology-based extraction logic 110 is configured to perform metadata extraction based on attributes of the resources 108 and user-defined policy and topology. In an example implementation, the topology-based extraction logic 110 registers a hierarchical resource-grouping construct, which is selected from multiple hierarchical resource-grouping constructs in a user-defined hierarchical resource-grouping topology of a cloud computing service account, by enumerating at least a subset of the hierarchical resource-grouping constructs. The subset of the hierarchical resource-grouping constructs includes the selected hierarchical resource-grouping construct and each other hierarchical resource-grouping construct that is encompassed by the selected hierarchical resource-grouping construct. The topology-based extraction logic 110 selectively extracts metadata from the hierarchical resource-grouping constructs that are included in the subset to provide extracted metadata based at least in part on one or more user-defined policies, which are assigned among the hierarchical resource-grouping constructs that are included in the subset, indicating whether the metadata is to be extracted as a result of the resources 108 that are associated with the hierarchical resource-grouping constructs that are included in the subset having specified attributes. The topology-based extraction logic 110 generates a searchable catalog that includes the extracted metadata.

The topology-based extraction logic 110 may be implemented in various ways to perform user-defined policy and topology based metadata extraction, including being implemented in hardware, software, firmware, or any combination thereof. For example, the topology-based extraction logic 110 may be implemented as computer program code configured to be executed in one or more processors. In another example, at least a portion of the topology-based extraction logic 110 may be implemented as hardware logic/electrical circuitry. For instance, at least a portion of the topology-based extraction logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The topology-based extraction logic 110 is shown to be incorporated in the first server(s) 106A for illustrative purposes and is not intended to be limiting. It will be recognized that the topology-based extraction logic 110 may be distributed among two or more of the servers 106A-106N, or the topology-based extraction logic 110 may be incorporated in a single one of the servers 106A-106N. It will be further recognized that the topology-based extraction logic 110 (or any portion(s) thereof) may be incorporated in any one or more of the user devices 102A-102M. For example, client-side aspects of the topology-based extraction logic 110 may be incorporated in one or more of the user devices 102A-102M, and server-side aspects of topology-based extraction logic 110 may be incorporated in one or more of the servers 106A-106N. In another example, the topology-based extraction logic 110 may be distributed among the user devices 102A-102M. In yet another example, the topology-based extraction logic 110 may be incorporated in a single one of the user devices 102A-102M.

Figure 2:
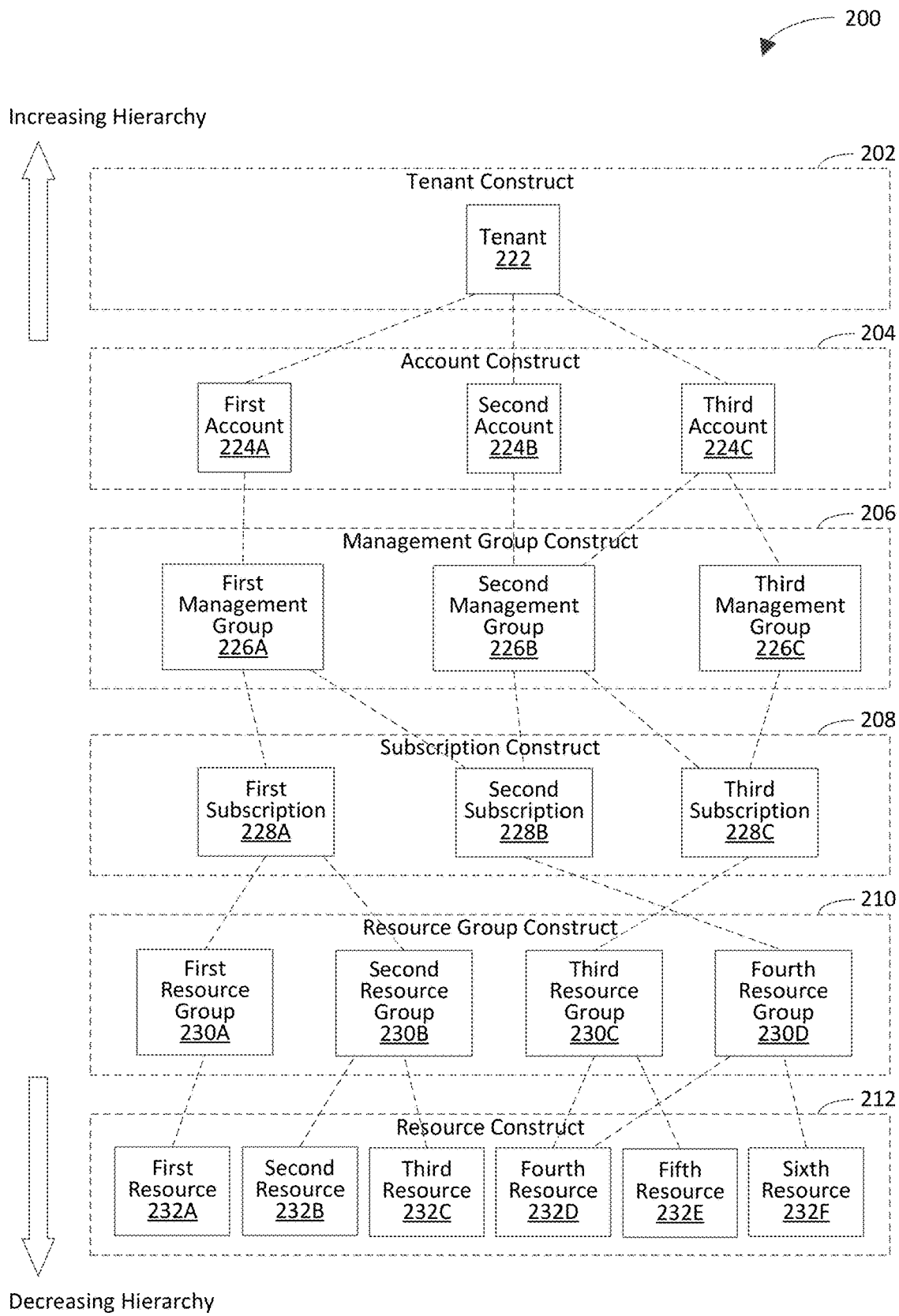
FIG. 2 is a block diagram of an example user-defined hierarchical resource-grouping topology in accordance with an embodiment.

FIG. 2 is a block diagram of an example user-defined hierarchical resource-grouping topology 200 in accordance with an embodiment. As shown in FIG. 2, the user-defined hierarchical resource-grouping topology 200 includes a tenant hierarchical resource-grouping construct (labeled "tenant construct") 202, an account hierarchical resource-grouping construct (labeled "account construct") 204, a management group hierarchical resource-grouping construct (labeled "management group construct") 206, a subscription hierarchical resource-grouping construct (labeled "subscription construct") 208, a resource group hierarchical resource-grouping construct (labeled "resource group construct") 210, and a resource hierarchical resource-grouping construct (labeled "resource construct") 212. In the embodiment of FIG. 2, the tenant construct 202 has the highest hierarchy in the user-defined hierarchical resource-grouping topology 200, and the resource construct 212 has the lowest hierarchy in the user-defined hierarchical resource-grouping topology 200. The tenant construct 202 has a higher hierarchy than the account construct 204. The account construct 204 has a higher hierarchy than the management group construct 206. The management group construct 206 has a higher hierarchy than the subscription construct 208. The subscription construct 208 has a higher hierarchy than the resource group construct 210. The resource group construct 210 has a higher hierarchy than the resource construct 212.

The resource group construct 210 encompasses the resource construct 212. The subscription construct 208 encompasses the resource group construct 210 and the resource construct 212. The management group construct 206 encompasses the subscription construct 208, the resource group construct 210, and the resource construct 212. The account construct 204 encompasses the management group construct 206, the subscription construct 208, the resource group construct 210, and the resource construct 212. The tenant construct 202 encompasses the account construct 204, the management group construct 206, the subscription construct 208, the resource group construct 210, and the resource construct 212.

The resource construct 212 is shown to include first, second, third, fourth, fifth, and sixth resources 232A-232F. The resource group construct 214 is shown to include first, second, third, and fourth resource groups 230A-230D. The first resource group 230A includes the first resource 232A. The second resource group 230B includes the second resource 232B and the third resource 232C. The third resource group 230C includes the fourth resource 232D and the fifth resource 232E. The fourth resource group 230D includes the fourth resource 230D and the sixth resource 232F.

The subscription construct 208 is shown to include first, second, and third subscriptions 228A-228C. The first subscription 228A includes the first resource group 230A and the second resource group 230B. The second subscription 228B includes the fourth resource group 230D. The third subscription 228C includes the third resource group 230C.

The management group construct 206 is shown to include first, second, and third management groups 226A-226C. The first management group 226A includes the first subscription 228A and the second subscription 228B. The second management group 226B includes the second subscription 228B and the third subscription 228C. The third management group 226C includes the third subscription 228C.

The account construct 204 is shown to include first, second, and third accounts 224A-224C. The first account 224A includes the first management group 226A. The second account 224B includes the second management group 226B. The third account 224C includes the second management group 226B and the third management group 226C.

The tenant construct 202 is shown to include tenant 222. The tenant 222 includes the first, second, and third accounts 224A-224C.

It will be recognized that the resources 232A-232F may be grouped among the hierarchical resource-grouping constructs 202, 204, 206, 208, 210, and 212 based on any suitable criteria. For instance, the resources 232A-232F may be grouped by function (e.g., organization hierarchy and/or functional teams). Once the resources 232A-232F are grouped among the hierarchical resource-grouping constructs 202, 204, 206, 208, 210, and 212, scan policies, classification policies, and access policies may be defined for each of the hierarchical resource-grouping constructs 202, 204, 206, 208, 210, and 212 in accordance with instructions received from a user. For instance, each policy may be defined to be a default policy or a custom policy, as instructed by the user. A scan policy is a policy that defines a manner in which a scan of resources is to be conducted (e.g., to identify attributes of the resources). For instance, the scan policy may indicate one or more criteria that are to be satisfied in order to scan the resources and/or condition(s) under which the scan it to be conducted. A classification policy is a policy that is configured to classify resources to have a common classification based at least in part on one or more criteria (e.g., extracted metadata indicating that the resources in the common classification have a common characteristic). An access policy is a policy that is configured to control access to resources based at least in part on one or more criteria (e.g., extracted metadata indicating that the resources have a common characteristic).

It will be further recognized that the user-defined hierarchical resource-grouping topology 200 need not necessarily include all of the constructs shown in FIG. 2. Moreover, the user-defined hierarchical resource-grouping topology 200 may include construct(s) in addition to or in lieu of any one or more of the constructs shown in FIG. 2. Each of the constructs may include any suitable number of entities. For instance, the resource construct 212 may include any suitable number of resources; the resource group construct 210 may include any suitable number of resource groups, and so on.

Figure 3:
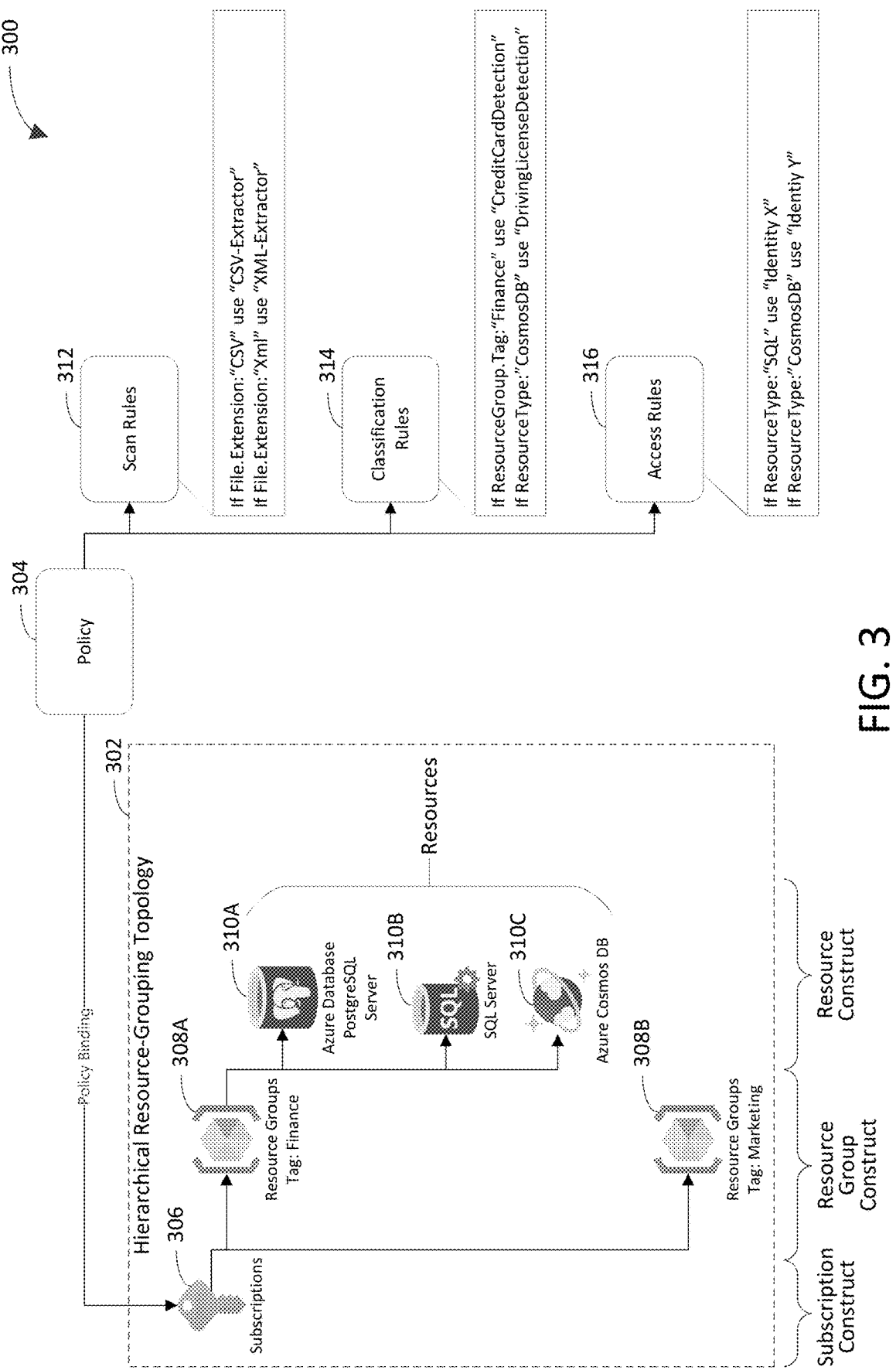
FIG. 3 illustrates an example policy binding between a hierarchical resource-grouping topology and a policy in accordance with an embodiment.

FIG. 3 illustrates an example policy binding 300 between a hierarchical resource-grouping topology 302 and a policy 304 in accordance with an embodiment. The policy binding associates the policy 304 with the hierarchical resource-grouping topology 302. The hierarchical resource-grouping topology 302 is shown to include a subscription construct, a resource group construct, and a resource construct. The subscription construct includes a subscription 306. The resource group construct includes a finance resource group 308A and a marketing resource group 308B. The resource construction includes a first resource (labeled "Azure Database PostgreSQL Server") 310A, a second resource (labeled "SQL Server") 310B, and a third resource (labeled "Azure Cosmos DB") 310C. The finance resource group 308A includes the first, second, and third resources 310A-310C.

The policy 304 includes scan rules 312, classification rules 314, and access rules 316. The scan rules 312 specify that if a file has a file extension of "CSV", then "CVS-extractor" is to be used to extract metadata associated with the file. The scan rules 312 further specify that if a file has a file extension of "xml", then "XML-extractor" is to be used to extract metadata associated with the file. The classification rules 314 specify that if a resource group has a tag of "Finance", then the resource group is to be classified into the "CreditCardDetection" classification. The classification rules 314 further specify that if a resource is of a type "CosmosDB", then the resource is to be classified into the "DrivingLicenseDetection" classification. The access rules 316 specify that if a resource is of a type "SQL", then an identity of "identify X" is to be assigned to the resource for purposes of connecting and authorizing the resource. The access rules 316 further specify that if a resource is of a type "CosmosDB", then an identity of "identify Y" is to be assigned to the resource for purposes of connecting and authorizing the resource.

The policy binding 300 is provided for non-limiting, illustrative purposes. The hierarchical resource-grouping topology 302 may include any suitable hierarchical resource-grouping constructs. The policy 304 may include any suitable scan rules, classification rules, and/or access rules.

Figure 4:
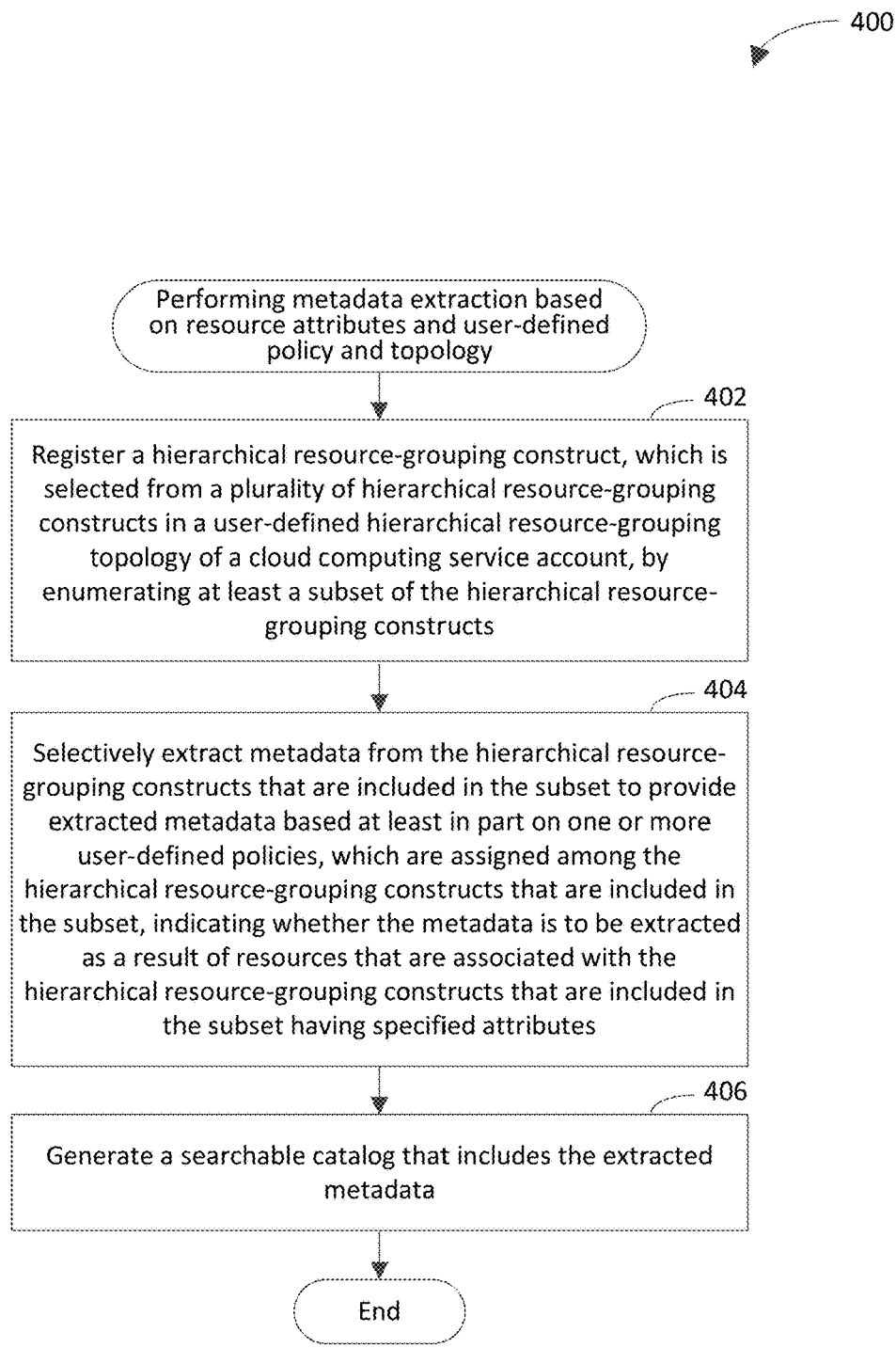
FIGS. 4 and 6 depict flowcharts of example methods for performing metadata extraction based on resource attributes and user-defined policy and topology in accordance with embodiments.
Figure 5:
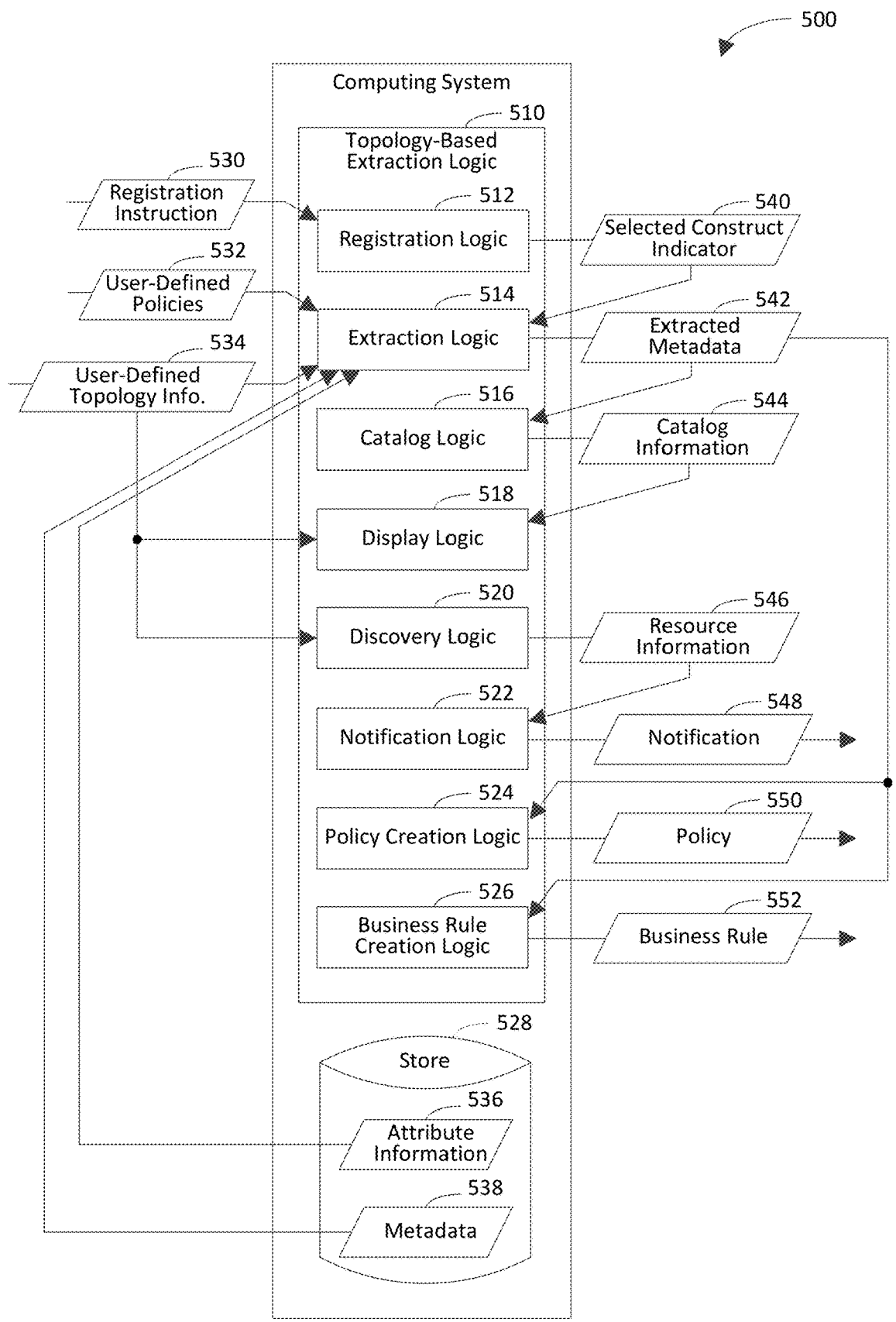
FIG. 5 is a block diagram of an example computing system in accordance with an embodiment.

FIG. 4 depicts a flowchart of an example method for performing metadata extraction based on resource attributes and user-defined policy and topology in accordance with an embodiment. Flowchart 400 may be performed by the first server(s) 106A, shown in FIG. 1, for example. For illustrative purposes, flowchart 400 is described with respect to computing system 500 shown in FIG. 5, which is an example implementation of the first server(s) 106A. As shown in FIG. 5, the computing system 500 includes topology-based extraction logic 510 and a store 528. The topology-based extraction logic 510 includes registration logic 512, extraction logic 514, catalog logic 516, display logic 518, discovery logic 520, notification logic 522, policy creation logic 524, and business rule creation logic 526. The store 528 may be any suitable type of store. One type of store is a database. For instance, the store 528 may be a relational database, an entity-relationship database, an object database, an object relational database, an extensible markup language (XML) database, etc. Further structural and operational embodiments will be apparent to persons skilled in the relevant art(s) based on the discussion regarding flowchart 400.

As shown in FIG. 4, the method of flowchart 400 begins at step 402. In step 402, a hierarchical resource-grouping construct, which is selected from a plurality of hierarchical resource-grouping constructs in a user-defined hierarchical resource-grouping topology of a cloud computing service account, is registered by enumerating at least a subset of the hierarchical resource-grouping constructs. The subset includes the selected hierarchical resource-grouping construct and each other hierarchical resource-grouping construct that is encompassed by the selected hierarchical resource-grouping construct. For instance, the subset may not include each hierarchical resource-grouping construct that is not encompassed by the selected hierarchical resource-grouping construct. In an example implementation, the registration logic 512 registers the selected hierarchical resource-grouping construct. For instance, the registration logic 512 may register the hierarchical resource-grouping construct in response to (e.g., based on) receipt of a registration instruction 530 from a user of a cloud computing service. In accordance with this implementation, the registration logic 512 may generate a selected construct indicator

540, which indicates (e.g., specifies) the selected hierarchical resource-grouping construct.

At step 404, metadata is selectively extracted from the hierarchical resource-grouping constructs that are included in the subset to provide extracted metadata based at least in part on one or more user-defined policies, which are assigned among the hierarchical resource-grouping constructs that are included in the subset, indicating whether the metadata is to be extracted as a result of resources that are associated with the hierarchical resource-grouping constructs that are included in the subset having specified attributes. For instance, each policy may define requirement(s) that are to be satisfied by one or more of the specified attributes of resource(s) in order for the metadata associated with the resource(s) to be extracted. The requirement(s) may be inclusionary or exclusionary. An inclusionary requirement specifies that a resource is to have designated attributes in order for metadata associated with the resource to be extracted. An exclusionary requirement specifies that a resource is not to have designated attributes in order for metadata associated with the resource to be extracted. Each resource may be a data source (e.g., data fabric) or a non-data source. A data source is a source of data asset(s). For instance, a data asset may be a file or a database entry. A non-data source is a source of non-data asset(s). A non-data asset is an asset that is not data.

It should be noted that a policy may have multiple conditions that must be satisfied by a hierarchical resource-grouping construct (or a leaf-level resource therein) in order for metadata to be extracted therefrom depending on which hierarchical resource-grouping construct the policy is targeted against. Depending on how the policy is authored, the policy may require attribute(s) of at least one entity in a hierarchical resource-grouping construct to satisfy requirement(s) defined by the policy or attribute(s) of all entities in the hierarchical resource-grouping construct to satisfy the requirement(s) based on the conditions defined by the policy.

In an example embodiment, selectively extracting the metadata at step 404 includes applying the one or more user-defined policies against attributes of the resources to determine which of the metadata are to be extracted from the hierarchical resource-grouping constructs that are included in the subset. In accordance with this embodiment, the one or more user-defined policies may be applied against the attributes of the resources at runtime of a scan of the hierarchical resource-grouping constructs that are included in the subset. For instance, the scan may be configured to identify the attributes of the resources. The one or more user-defined policies may indicate scan rules that are to be applied to the scan. A scan rule may indicate which classification rules are to be applied to the metadata, enable other metadata in addition to the metadata that is stored in the cloud to be extracted, indicate a type of information (e.g., encrypted information or custom files) to be scanned or extracted, indicate types of files to be the subject of schema or classification, etc.

In yet another example embodiment, selectively extracting the metadata at step 404 includes applying at least one policy to identify a resource that is to be scanned for purposes of metadata extraction. In accordance with this embodiment, selectively extracting the metadata at step 404 includes selectively extracting metadata that is associated with the resource by applying user-defined scan configurations and settings that are applicable to the resource. In an example, the user-defined scan configurations and settings may indicate that a scan is to be performed with regard to only identified files. In another example, the user-defined scan configurations and settings may indicate an environment in which the scan is to be performed. For instance, the environment may be a test environment or a production environment. In yet another example, the user-defined scan configurations and settings may indicate geographic locations of the cloud in which the scan is to be performed. In still another example, the user-defined scan configurations and settings may indicate file extensions types for which the scan is to be performed.

In another example embodiment, selectively extracting the metadata at step 404 includes determining that a user-defined policy is assigned to the selected hierarchical resource-grouping construct. In accordance with this embodiment, selectively extracting the metadata at step 404 further includes applying the policy to the selected hierarchical resource-grouping construct and each other hierarchical resource-grouping construct that is encompassed by the selected hierarchical resource-grouping construct based at least in part on a determination that the user-defined policy is assigned to the selected hierarchical resource-grouping construct.

In an example implementation, the extraction logic 514 selectively extracts the metadata from the hierarchical resource-grouping constructs that are included in the subset to provide extracted metadata 542 based at least in part on one or more user-defined policies 532 indicating whether the metadata is to be extracted. The extraction logic 514 may analyze the user-defined policies 532, the selected construct indicator 540, user-defined topology information 534, and attribute information 536 to determine which of the metadata 538 is to be extracted from the hierarchical resource-grouping constructs that are included in the subset. For example, the extraction logic 514 may cross-reference the selected construct indicator 540, which indicates the selected hierarchical resource-grouping construct, with the user-defined topology information 534, which describes the hierarchical resource-grouping topology, to identify the selected hierarchical resource-grouping construct in the hierarchical resource-grouping topology. The extraction logic 514 may analyze the user-defined topology information 534 to identify hierarchical resource-grouping constructs that are encompassed by the selected hierarchical resource-grouping construct. The extraction logic 514 may analyze the attribute information 536 to determine which attributes are associated with each resource. For instance, the attribute information 536 may cross-reference the attributes with the resources that have those attributes. The extraction logic 514 may then apply policies from the user-defined policies 532 that are assigned to the selected hierarchical resource-grouping construct and/or any one or more of the hierarchical resource-grouping constructs that are encompassed by the selected hierarchical resource-grouping construct in order to determine which of the metadata 538 is to be extracted to provide the extracted metadata 542.

For instance, the extraction logic 514 may extract metadata from the selected hierarchical resource-grouping construct and each hierarchical resource-grouping construct encompassed by the selected hierarchical resource-grouping construct based on attributes associated with resources in the hierarchical resource-grouping constructs, as indicated by the attribute information 536, satisfying requirement(s) defined by the policies that are assigned to the hierarchical resource-grouping constructs. The extraction logic 514 is configured to apply the policies that are assigned to each such hierarchical resource-grouping construct to the hierarchical resource-grouping construct to which the policies are assigned and to each hierarchical resource-grouping construct that is encompassed by the hierarchical resource-grouping construct to which the policies are applied, except that a policy that is assigned to a hierarchical resource-grouping construct is not applied to a hierarchical resource-grouping construct that is encompassed by the hierarchical resource-grouping construct to which the policy is assigned if the policy conflicts with a policy that is assigned to the encompassed hierarchical resource-grouping construct.

In an example, the user-defined policies 532 may indicate that metadata of resources having attributes that satisfy first conditions is to be extracted and metadata of resources having attributes that satisfy second conditions is not to be extracted. In accordance with this example, the extraction logic 514 may determine from which resources metadata is to be extracted based on the attributes of those resources satisfying the first conditions (e.g., and further based on the attributes of those resources not satisfying the second conditions).

At step 406, a searchable catalog is generated that includes the extracted metadata. In an example implementation, the catalog logic 516 generates the searchable catalog, which includes the extracted metadata 542. For instance, the catalog logic 516 may generate catalog information 544 to include the searchable catalog. For instance, the catalog logic 516 may provide the catalog information 544 to a user of the cloud computing service account.

In an example embodiment, the searchable catalog is generated at step 406 to further include hierarchical information, which describes the user-defined hierarchical resource-grouping topology. For example, the hierarchical information may indicate (e.g., include) the identities of the respective resources that are associated with each hierarchical resource-grouping construct that is included in the subset. It should be noted that preserving the hierarchy information along with the extracted metadata may enable a user of the cloud computing service account to map indications of the extracted metadata in the searchable catalog to indications of the metadata associated with the hierarchical resource-grouping constructs in the user-defined hierarchical resource-grouping topology.

In another example embodiment, an identified hierarchical resource-grouping construct that is included in the subset defines a resource group, which includes a subset of the resources, based at least in part on the resources in the subset of the resources having a common characteristic. In accordance with this embodiment, selectively extracting the metadata at step 404 includes selectively extracting metadata from the identified hierarchical resource-grouping construct based at least in part on at least one user-defined policy, which is assigned to the identified hierarchical resource-grouping construct, indicating whether the metadata from the identified hierarchical resource-grouping construct is to be extracted as a result of attribute(s) of the resources in the resource group satisfying requirement(s) defined by the at least one user-defined policy.

In some example embodiments, one or more steps 402, 404, and/or 406 of flowchart 400 may not be performed. Moreover, steps in addition to or in lieu of steps 402, 404, and/or 406 may be performed. For instance, in an example embodiment, the method of flowchart 400 further includes determining that first aspects of a first user-defined policy, which is assigned to the selected hierarchical resource-grouping construct, conflict with second aspects of a second user-defined policy, which is assigned to a second hierarchical resource-grouping construct that is encompassed by the selected hierarchical resource-grouping construct. In accordance with this embodiment, the one or more user-defined policies including the first user-defined policy and the second user-defined policy. In an example implementation, the extraction logic 514 determines that the first aspects of the first user-defined policy conflict with the second aspects of the second user-defined policy. In further accordance with this embodiment, selectively extracting the metadata at step 404 includes implementing the second aspects of the second user-defined policy in lieu of the first aspects of the first user-defined policy based at least in part on the second user-defined policy having a priority (e.g., for purposes of policy application) that is greater than a priority of the first user-defined policy as a result of the second hierarchical resource-grouping construct being encompassed by the selected hierarchical resource-grouping construct.

For instance, a general rule may be established that hierarchical resource-grouping constructs in the hierarchical resource-grouping topology have a higher priority than the hierarchical resource-grouping constructs that encompass them. For example, if a first hierarchical resource-grouping construct is encompassed by a second hierarchical resource-grouping construct, which is encompassed by a third hierarchical resource-grouping construct, which is encompassed by a fourth hierarchical resource-grouping construct, the first hierarchical resource-grouping construct may have a priority that is greater than the priorities of the respective second, third, and fourth hierarchical resource-grouping constructs. In accordance with this example, the second hierarchical resource-grouping construct may have a priority that is greater than the priorities of the respective third and fourth hierarchical resource-grouping constructs. In further accordance with this example, the third hierarchical resource-grouping construct may have a priority that is greater than the priority of the fourth hierarchical resource-grouping construct.

In another example embodiment, the method of flowchart 400 further includes causing a visual representation of the user-defined hierarchical resource-grouping topology of the cloud computing service account and information regarding extraction of the extracted metadata to be displayed on a display of a computing device. For instance, the information regarding extraction of the extracted metadata may include statistics that result from selectively extracting the metadata. In an example implementation, the display logic 518 causes the visual representation of the user-defined hierarchical resource-grouping topology and the information regarding extraction of the extracted metadata 542 to be displayed on the display. For example, the display logic 518 may cause the visual representation to be displayed based on receipt of the catalog information 544 and the user-defined topology information 534. In accordance with this example, the user-defined topology information 534 may describe the user-defined hierarchical resource-grouping topology, and the catalog information 544 may describe the extraction of the extracted metadata 542. In further accordance with this example, the display logic 518 may generate an image signal that is based on the user-defined topology information 534 and the catalog information 544 to be displayed by the display.

In yet another example embodiment, the method of flowchart 400 further includes discovering a resource that is not specified in the user-defined hierarchical resource-grouping topology of the cloud computing service account. It will be recognized that the discovered resource may be included in a resource that is specified in the user-defined hierarchical resource-grouping topology of the cloud computing service account. In an example implementation, the discovery logic 520 discovers the resource that is not specified in the user-defined hierarchical resource-grouping topology. In accordance with this implementation, the discovery logic 520 may analyze the user-defined topology information 534 to determine that the resource is not specified in the user-defined hierarchical resource-grouping topology. In further accordance with this implementation, the discovery logic 520 may generate resource information 546, which identifies the discovered resource. The resource information 546 may indicate that the discovered resource is not specified in the user-defined hierarchical resource-grouping topology of the cloud computing service account. In accordance with this embodiment, the method of flowchart 400 further includes notifying a user who defined the user-defined hierarchical resource-grouping topology of the cloud computing service account of existence of the discovered resource. For example, the user may be notified prior to selectively extracting the metadata at step 404. In an example implementation, the notification logic 522 generates a notification 548 that indicates the existence of the discovered resource. For instance, the notification 548 may identify the discovered resource. The notification 548 may indicate that the discovered resource is not specified in the user-defined hierarchical resource-grouping topology of the cloud computing service account. In accordance with this implementation, the notification logic 522 may analyze the resource information 546 to determine that the discovered resource exists. For instance, the notification logic 522 may determine the identity of the discovered resource from the analysis of the resource information 546. The notification logic 522 may determine that the discovered resource is not specified in the user-defined hierarchical resource-grouping topology of the cloud computing service account from the analysis of the resource information 546.

In still another example embodiment, the method of flowchart 400 further includes creating an access policy that is configured to control access to at least a subset of the resources based at least in part on the extracted metadata indicating that the resources in the subset have a common (e.g., same) characteristic. For instance, the common characteristic may include a common manner in which to connect and/or authorize to the resources in the subset. In an example implementation, the policy creation logic 524 creates a policy 550, which includes the access policy, based at least in part on the extracted metadata 542 indicating that the resources in the subset have the common characteristic.

In another example embodiment, the method of flowchart 400 further includes creating a classification policy that is configured to classify at least some of the resources to have a common classification based at least in part on the extracted metadata indicating that the resources in the common classification have a common characteristic. For instance, the common characteristic may include a common format of data of the at least some of the resources. In an example implementation, the policy creation logic 524 creates a policy 550, which includes the classification policy, based at least in part on the extracted metadata 542 indicating that the resources in the common classification have the common characteristic.

In yet another example embodiment, the method of flowchart 400 further includes creating a business rule that is configured to cause at least a subset of the extracted metadata to be further processed based at least in part on the extracted metadata indicating that the extracted metadata in the subset have a common characteristic. For example, the common characteristic may include an indication that resources associated with the subset of the extracted metadata are of a common type and/or are stored in a common storage location (e.g., folder/directory). In another example, the common characteristic may include an indication that assets created or owned by a first user are stored in an account of a second user who is different from the first user. The business rule may be created for any of a variety of purposes, including but not limited to governance, browse search, and data exploration. In an example scenario, the subset of the extracted metadata may indicate that the data with which the metadata is associated includes social security number(s). In accordance with this scenario, the business rule may establish an access policy that is configured to restrict access to data to only selected person(s) (e.g., only the owner of the data) if a social security number is detected in the data. The business rule may specify that if a classification type of "social security number" is detected, a tag indicating "social security" is to be add to the metadata or a tag indicating "this is highly sensitive data" is to be added to the metadata. In an example implementation, the business rule creation logic 526 creates a business rule 552 that is configured to cause at least a subset of the extracted metadata 542 to be further processed based at least in part on the extracted metadata 542 indicating that the extracted metadata 542 that is included in the subset have a common characteristic.

It will be recognized that the computing system 500 may not include one or more of the topology-based extraction logic 510, the registration logic 512, the extraction logic 514, the catalog logic 516, the display logic 518, the discovery logic 520, the notification logic 522, the policy creation logic 524, the business rule creation logic 526, and/or the store 528. Furthermore, the computing system 500 may include components in addition to or in lieu of the topology-based extraction logic 510, the registration logic 512, the extraction logic 514, the catalog logic 516, the display logic 518, the discovery logic 520, the notification logic 522, the policy creation logic 524, the business rule creation logic 526, and/or the store 528.

Figure 6:
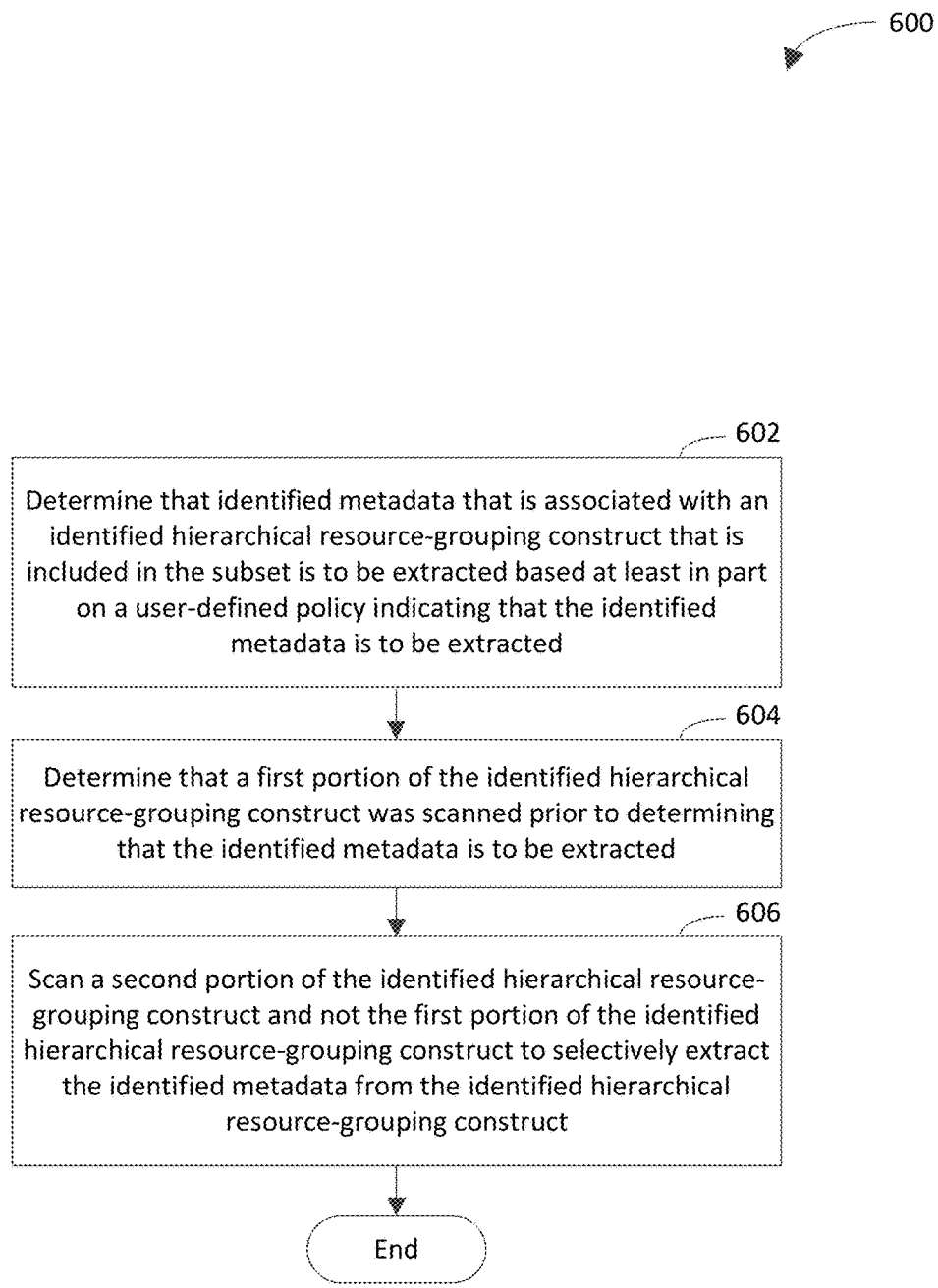
Figure 7:
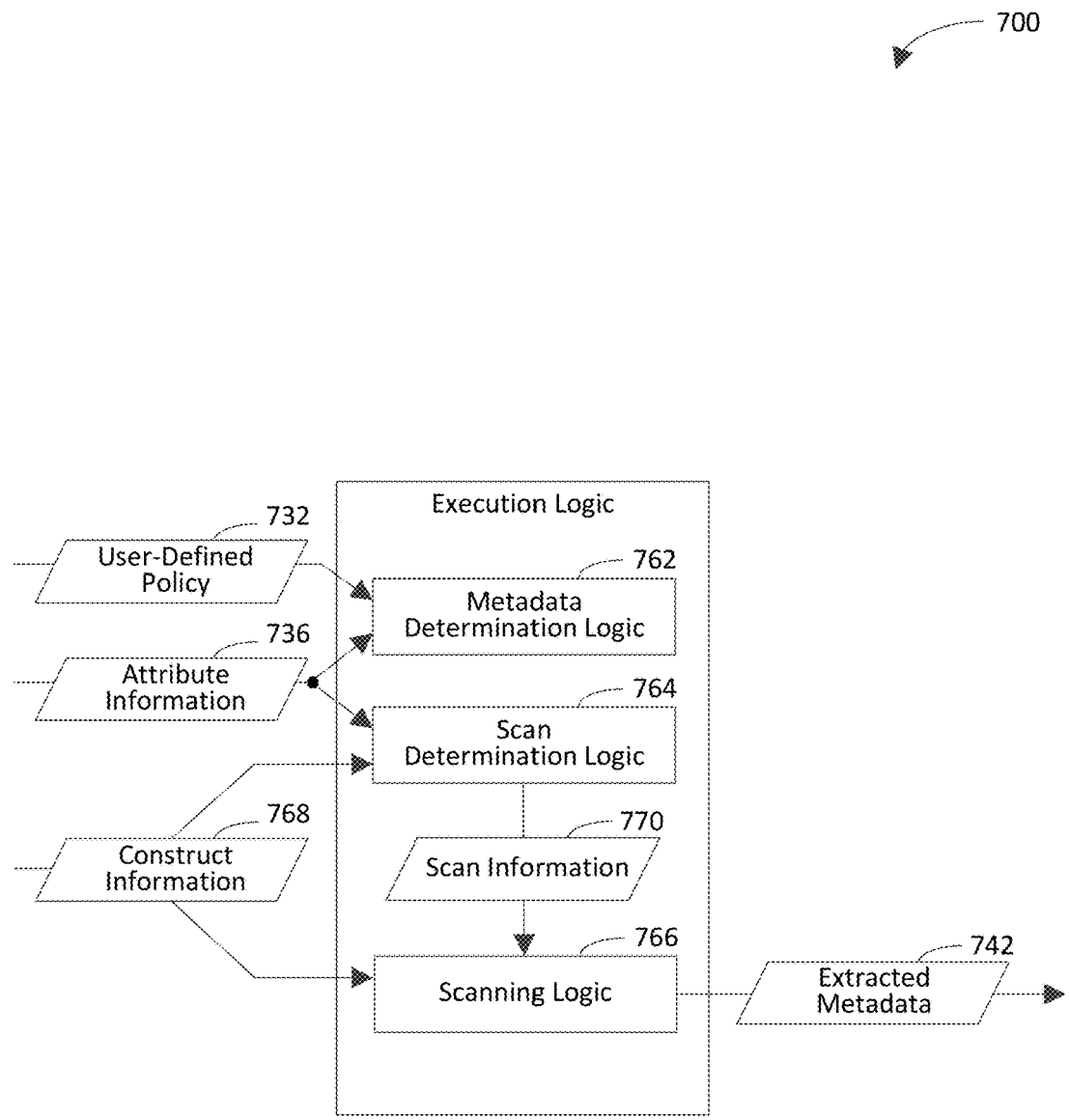
FIG. 7 is a block diagram of an example implementation of execution logic shown in FIG. 1 in accordance with an embodiment.

In another example embodiment, selectively extracting the metadata at step 404 includes one or more of the steps shown in flowchart 600 in FIG. 6. Flowchart 600 may be performed by the extraction logic 514, shown in FIG. 5, for example. For illustrative purposes, flowchart 600 is described with respect to extraction logic 700 shown in FIG. 7, which is an example implementation of the extraction logic 514. As shown in FIG. 7, the extraction logic 700 includes metadata determination logic 762, scan determination logic 764, and scanning logic 766. Further structural and operational embodiments will be apparent to persons skilled in the relevant art(s) based on the discussion regarding flowchart 600.

As shown in FIG. 6, the method of flowchart 600 begins at step 602. In step 602, a determination is made that identified metadata that is associated with an identified hierarchical resource-grouping construct that is included in the subset is to be extracted based at least in part on a user-defined policy indicating that the identified metadata is to be extracted as a result of at least one attribute of at least one resource that is associated with the identified hierarchical resource-grouping construct satisfying at least one requirement defined by the user-defined policy. In an example implementation, the metadata determination logic 762 determines that the identified metadata is to be extracted. For instance, the metadata determination logic 762 may make the determination based at least in part on a user-defined policy 732 indicating that the identified metadata is to be extracted as a result of at least one attribute of at least one resource that is associated with the identified hierarchical resource-grouping construct satisfying at least one requirement defined by the user-defined policy 732. For example, the metadata determination logic 762 may analyze attribute information 736 to determine the attributes of the resources that are associated with the identified hierarchical resource-grouping construct. For instance, the attribute information 736 may cross-reference the attributes with the resources that have those attributes. By reviewing the attribute information 736, the metadata determination logic 762 may determine that of at least one resource that is associated with the identified hierarchical resource-grouping construct has the at least one attribute. By applying the user-defined policy 732 against the attribute information 736, the metadata determination logic 762 may determine that the at least one attribute of the at least one resource that is associated with the identified hierarchical resource-grouping construct satisfies at least one requirement defined by the user-defined policy 732.

At step 604, a determination is made that a first portion of the identified hierarchical resource-grouping construct was scanned prior to determining that the identified metadata is to be extracted. In an example implementation, the scan determination logic 764 determines that the first portion was scanned prior to performance of step 602. For example, the scan determination logic 764 may analyze the attribute information 736 and the construct information 768 to make the determination. In accordance with this example, the scan determination logic 764. In accordance with this example, the attribute information 736 may indicate resources that have been scanned. In further accordance with this example, the construct information 768 may indicate which resources are associated with each hierarchical resource-grouping construct in the hierarchical resource-grouping topology. The scan determination logic 764 may cross-reference the resources that are associated with the identified hierarchical resource-grouping construct, as indicated by the construct information 768, with the resources that have been scanned, as indicated by the attribute information 736, to determine the first portion of the identified hierarchical resource-grouping construct, which was scanned prior to determining that the identified metadata is to be extracted. In accordance with this implementation, the scan determination logic 764 may generate scan information 770, which indicates the first portion of the identified hierarchical resource-grouping construct, which was scanned prior to determining that the identified metadata is to be extracted. For instance, the scan information 770 may identify each resource that is included in the first portion of the identified hierarchical resource-grouping construct.

At step 606, a second portion of the identified hierarchical resource-grouping construct and not the first portion of the identified hierarchical resource-grouping construct is scanned to selectively extract the identified metadata from the identified hierarchical resource-grouping construct based at least in part on determining that the first portion of the identified hierarchical resource-grouping construct was scanned prior to determining that the identified metadata is to be extracted. For example, the first portion of the identified hierarchical resource-grouping construct may be determined based at least in part on metadata that was extracted from the identified hierarchical resource-grouping construct prior to determining that the identified metadata is to be extracted indicating that the first portion of the identified hierarchical resource-grouping construct was scanned prior to determining that the identified metadata is to be extracted. For instance, the metadata that was extracted from the identified hierarchical resource-grouping construct prior to determining that the identified metadata is to be extracted may include at least one time stamp that indicates a time at which the first portion of the identified hierarchical resource-grouping construct was scanned.

In an example implementation, the scanning logic 766 scans the second portion of the identified hierarchical resource-grouping construct and not the first portion of the identified hierarchical resource-grouping construct to selectively extract the identified metadata from the identified hierarchical resource-grouping construct based at least in part on a determination that the first portion of the identified hierarchical resource-grouping construct was scanned prior to determining that the identified metadata is to be extracted. For instance, the scanning logic 766 may scan the second portion and not the second portion based on the scan information 770 and the construct information 768. For example, the scanning logic 766 may analyze the construct information 768 to determine the resources that are associated with the identified hierarchical resource-grouping construct. In accordance with this example, the scanning logic 766 may analyze the scan information 770 to determine the resources that are included in the first portion of the identified hierarchical resource-grouping construct. In further accordance with this example, the scanning logic 766 may determine the second portion of the identified hierarchical resource-grouping construct by excluding the first portion, as indicated by the scan information 770, from the resources that are associated with the identified hierarchical resource-grouping construct, as indicated by the construction information 768. In response to scanning the second portion of the identified hierarchical resource-grouping construct, the scanning logic 766 may provide extracted metadata 742, including the extracted identified metadata from the identified hierarchical resource-grouping construct.

It will be recognized that the execution logic 700 may not include one or more of the metadata determination logic 762, the scan determination logic 764, and/or the scanning logic 766. Furthermore, the execution logic 700 may include components in addition to or in lieu of the metadata determination logic 762, the scan determination logic 764, and/or the scanning logic 766.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the topology-based extraction logic 110, the topology-based extraction logic 510, the registration logic 512, the extraction logic 514, the catalog logic 516, the display logic 518, the discovery logic 520, the notification logic 522, the policy creation logic 524, the business rule creation logic 526, the metadata determination logic 762, the scan determination logic 764, the scanning logic 766, flowchart 400, and/or flowchart 600 may be implemented in hardware, software, firmware, or any combination thereof.

For example, any one or more of the topology-based extraction logic 110, the topology-based extraction logic 510, the registration logic 512, the extraction logic 514, the catalog logic 516, the display logic 518, the discovery logic 520, the notification logic 522, the policy creation logic 524, the business rule creation logic 526, the metadata determination logic 762, the scan determination logic 764, the scanning logic 766, flowchart 400, and/or flowchart 600 may be implemented, at least in part, as computer program code configured to be executed in one or more processors.

In another example, any one or more of the topology-based extraction logic 110, the topology-based extraction logic 510, the registration logic 512, the extraction logic 514, the catalog logic 516, the display logic 518, the discovery logic 520, the notification logic 522, the policy creation logic 524, the business rule creation logic 526, the metadata determination logic 762, the scan determination logic 764, the scanning logic 766, flowchart 400, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
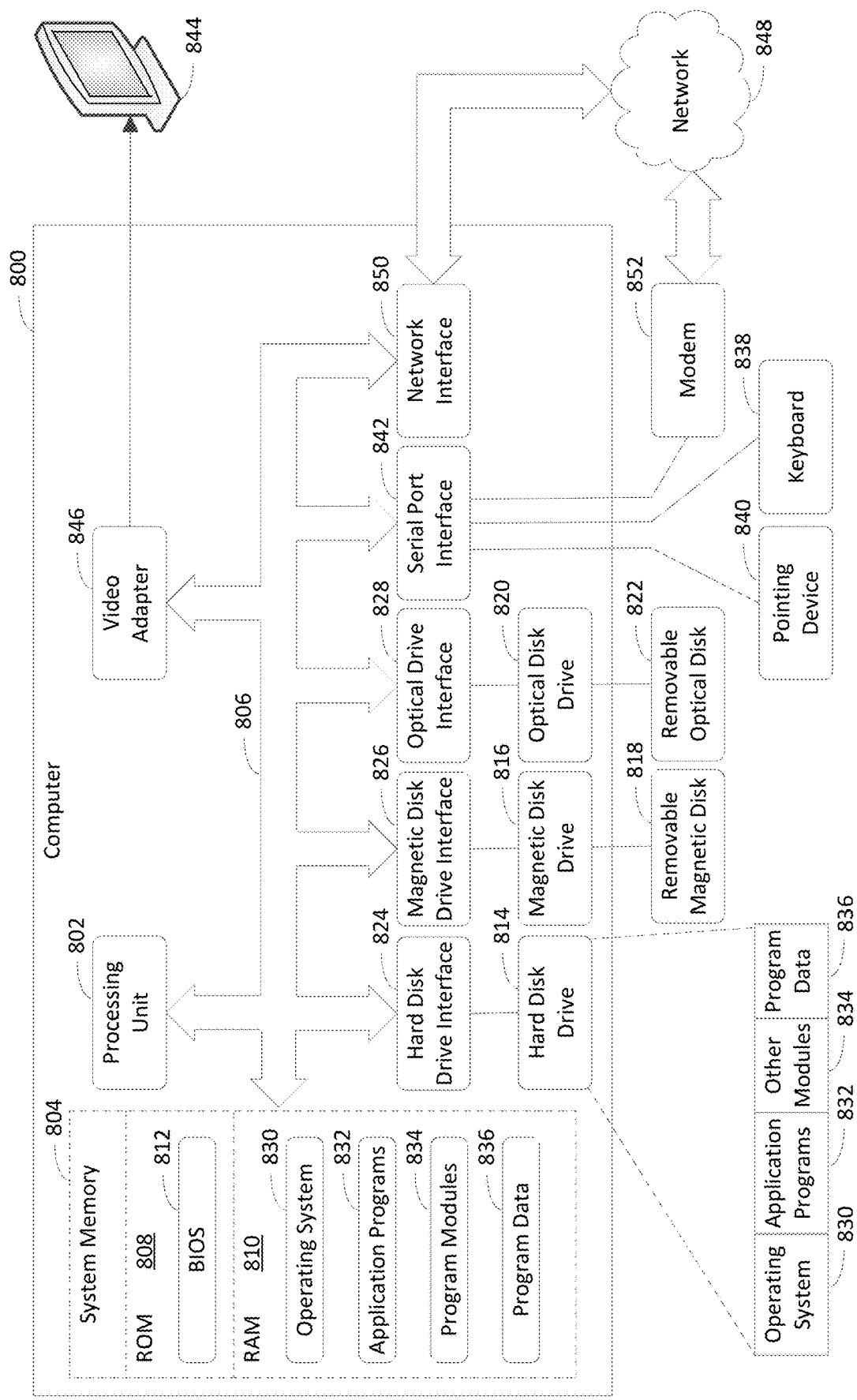
FIG. 8 depicts an example computer in which embodiments may be implemented.

III. Further Discussion of Some Example Embodiments (A1) An example system (FIG. 1, 106A-106N; FIG. 5, 500) to perform metadata extraction based on resource attributes and user-defined policy and topology comprises memory (FIG. 5, 528; FIG. 8, 804, 808, 810) and one or more processors (FIG. 8, 802) coupled to the memory. The one or more processors are configured to register (FIG. 4, 402) a hierarchical resource-grouping construct, which is selected from a plurality of hierarchical resource-grouping constructs (FIG. 2, 202, 204, 206, 208, 210, 212) in a user-defined hierarchical resource-grouping topology (FIG. 2, 200) of a cloud computing service account, by enumerating at least a subset of the hierarchical resource-grouping constructs, the subset including the selected hierarchical resource-grouping construct and each other hierarchical resource-grouping construct that is encompassed by the selected hierarchical resource-grouping construct. The one or more processors are further configured to selectively extract (FIG. 4, 404) metadata from the hierarchical resource-grouping constructs that are included in the subset to provide extracted metadata (FIG. 5, 542) based at least in part on one or more user-defined policies (FIG. 5, 532), which are assigned among the hierarchical resource-grouping constructs that are included in the subset, indicating whether the metadata is to be extracted as a result of resources (FIG. 1, 108) that are associated with the hierarchical resource-grouping constructs that are included in the subset having specified attributes. The one or more processors are further configured to generate (FIG. 4, 406) a searchable catalog that includes the extracted metadata.

(A2) In the example system of A1, wherein the one or more processors are configured to: determine that first aspects of a first user-defined policy, which is assigned to the selected hierarchical resource-grouping construct, conflict with second aspects of a second user-defined policy, which is assigned to a second hierarchical resource-grouping construct that is encompassed by the selected hierarchical resource-grouping construct, the one or more user-defined policies including the first user-defined policy and the second user-defined policy; and implement the second aspects of the second user-defined policy in lieu of the first aspects of the first user-defined policy based at least in part on the second user-defined policy having a priority that is greater than a priority of the first user-defined policy as a result of the second hierarchical resource-grouping construct being encompassed by the selected hierarchical resource-grouping construct.

(A3) In the example system of any of A1-A2, wherein an identified hierarchical resource-grouping construct that is included in the subset defines a resource group, which includes a subset of the resources, based at least in part on the resources in the subset of the resources having a common characteristic; and wherein the one or more processors are configured to selectively extract metadata from the identified hierarchical resource-grouping construct based at least in part on at least one user-defined policy, which is assigned to the identified hierarchical resource-grouping construct, indicating whether the metadata from the identified hierarchical resource-grouping construct is to be extracted as a result of one or more attributes of the resources in the resource group satisfying one or more requirements defined by the at least one user-defined policy.

(A4) In the example system of any of A1-A3, wherein the one or more processors are configured to selectively extract the metadata by performing operations, the operations comprising: determine that a user-defined policy is assigned to the selected hierarchical resource-grouping construct; and apply the policy to the selected hierarchical resource-grouping construct and each other hierarchical resource-grouping construct that is encompassed by the selected hierarchical resource-grouping construct based at least in part on a determination that the user-defined policy is assigned to the selected hierarchical resource-grouping construct.

(A5) In the example system of any of A1-A4, wherein the one or more processors are configured to selectively extract the metadata by performing operations, the operations comprising: determine that identified metadata that is associated with an identified hierarchical resource-grouping construct that is included in the subset is to be extracted based at least in part on a user-defined policy indicating that the identified metadata is to be extracted as a result of at least one attribute of at least one resource that is associated with the identified hierarchical resource-grouping construct satisfying at least one requirement defined by the user-defined policy; determine that a first portion of the identified hierarchical resource-grouping construct was scanned prior to a determination that the identified metadata is to be extracted; and scan a second portion of the identified hierarchical resource-grouping construct and not the first portion of the identified hierarchical resource-grouping construct to selectively extract the identified metadata from the identified hierarchical resource-grouping construct based at least in part on determining that the first portion of the identified hierarchical resource-grouping construct was scanned prior to determining that the identified metadata is to be extracted.

(A6) In the example system of any of A1-A5, wherein the one or more processors are further configured to: cause a visual representation of the user-defined hierarchical resource-grouping topology of the cloud computing service account and information regarding extraction of the extracted metadata to be displayed on a display of a computing device.
(A7) In the example system of any of A1-A6, wherein the one or more processors are further configured to: discover a resource that is not specified in the user-defined hierarchical resource-grouping topology of the cloud computing service account and that is capable of being utilized for metadata extraction and access policy; and notify a user who defined the user-defined hierarchical resource-grouping topology of the cloud computing service account of existence of the discovered resource.
(A8) In the example system of any of A1-A7, wherein the one or more processors are further configured to: create an access policy that is configured to control access to at least a subset of the resources based at least in part on the extracted metadata indicating that the resources in the subset have a common characteristic.
(A9) In the example system of any of A1-A8, wherein the one or more processors are further configured to: create a classification policy that is configured to classify at least some of the resources to have a common classification based at least in part on the extracted metadata indicating that the resources in the common classification have a common characteristic.
(A10) In the example system of any of A1-A9, wherein the one or more processors are further configured to: create a business rule that is configured to cause at least a subset of the extracted metadata to be further processed based at least in part on the extracted metadata indicating that the extracted metadata in the subset have a common characteristic.
(A11) In the example system of any of A1-A10, wherein the one or more processors are configured to selectively extract the metadata by performing operations, the operations comprising: apply at least one policy to identify a resource that is to be scanned for purposes of metadata extraction; and selectively extract metadata that is associated with the resource by applying user-defined scan configurations and settings that are applicable to the resource.
(A12) In the example system of any of A1-A11, wherein the one or more processors are configured to: generate the searchable catalog that further includes hierarchical information, which describes the user-defined hierarchical resource-grouping topology.
(A13) In the example system of any of A1-A12, wherein the subset of the hierarchical resource-grouping constructs includes an account hierarchical resource-grouping construct that includes one or more accounts, each account corresponding to a respective portion of the resources that are associated with the hierarchical resource-grouping constructs that are included in the subset.
(B1) An example method of performing metadata extraction based on resource attributes and user-defined policy and topology, the method implemented by a computing system (FIG. 1, 106A-106N; FIG. 5, 500), comprises: registering (FIG. 4, 402) a hierarchical resource-grouping construct, which is selected from a plurality of hierarchical resource-grouping constructs (FIG. 2, 202, 204, 206, 208, 210, 212) in a user-defined hierarchical resource-grouping topology (FIG. 2, 200) of a cloud computing service account, by enumerating at least a subset of the hierarchical resource-grouping constructs, the subset including the selected hierarchical resource-grouping construct and each other hierarchical resource-grouping construct that is encompassed by the selected hierarchical resource-grouping construct; selectively extracting (FIG. 4, 404) metadata from the hierarchical resource-grouping constructs that are included in the subset to provide extracted metadata (FIG. 5, 542) based at least in part on one or more user-defined policies, which are assigned among the hierarchical resource-grouping constructs that are included in the subset, indicating whether the metadata is to be extracted as a result of resources (FIG. 1, 108) that are associated with the hierarchical resource-grouping constructs that are included in the subset having specified attributes; and generating (FIG. 4, 406) a searchable catalog that includes the extracted metadata.
(B2) In the method of B1, further comprising: determining that first aspects of a first user-defined policy, which is assigned to the selected hierarchical resource-grouping construct, conflict with second aspects of a second user-defined policy, which is assigned to a second hierarchical resource-grouping construct that is encompassed by the selected hierarchical resource-grouping construct, the one or more user-defined policies including the first user-defined policy and the second user-defined policy; wherein selectively extracting the metadata comprises: implementing the second aspects of the second user-defined policy in lieu of the first aspects of the first user-defined policy based at least in part on the second user-defined policy having a priority that is greater than a priority of the first user-defined policy as a result of the second hierarchical resource-grouping construct being encompassed by the selected hierarchical resource-grouping construct.
(B3) In the method of any of B1-B2, wherein an identified hierarchical resource-grouping construct that is included in the subset defines a resource group, which includes a subset of the resources, based at least in part on the resources in the subset of the resources having a common characteristic; and wherein selectively extracting the metadata comprises selectively extracting metadata from the identified hierarchical resource-grouping construct based at least in part on at least one user-defined policy, which is assigned to the identified hierarchical resource-grouping construct, indicating whether the metadata from the identified hierarchical resource-grouping construct is to be extracted as a result of one or more attributes of the resources in the resource group satisfying one or more requirements defined by the at least one user-defined policy.
(B4) In the method of any of B1-B3, wherein selectively extracting the metadata comprises: determining that a user-defined policy is assigned to the selected hierarchical resource-grouping construct; and applying the policy to the selected hierarchical resource-grouping construct and each other hierarchical resource-grouping construct that is encompassed by the selected hierarchical resource-grouping construct based at least in part on a determination that the user-defined policy is assigned to the selected hierarchical resource-grouping construct.
(B5) In the method of any of B1-B4, wherein selectively extracting the metadata comprises: determining that identified metadata that is associated with an identified hierarchical resource-grouping construct that is included in the subset is to be extracted based at least in part on a user-defined policy indicating that the identified metadata is to be extracted as a result of at least one attribute of at least one resource that is associated with the identified hierarchical resource-grouping construct satisfying at least one requirement defined by the user-defined policy; determining that a first portion of the identified hierarchical resource-grouping construct was scanned prior to determining that the identified metadata is to be extracted; and scanning a second portion of the identified hierarchical resource-grouping construct and not the first portion of the identified hierarchical resource-grouping construct to selectively extract the identified metadata from the identified hierarchical resource-grouping construct based at least in part on determining that the first portion of the identified hierarchical resource-grouping construct was scanned prior to determining that the identified metadata is to be extracted.

(B6) In the method of any of B1-B5, further comprising: causing a visual representation of the user-defined hierarchical resource-grouping topology of the cloud computing service account and information regarding extraction of the extracted metadata to be displayed on a display of the computing system.

(B7) In the method of any of B1-B6, further comprising: discovering a resource that is not specified in the user-defined hierarchical resource-grouping topology of the cloud computing service account and that is capable of being utilized for metadata extraction and access policy; and notifying a user who defined the user-defined hierarchical resource-grouping topology of the cloud computing service account of existence of the discovered resource.

(B8) In the method of any of B1-B7, further comprising: creating an access policy that is configured to control access to at least a subset of the resources based at least in part on the extracted metadata indicating that the resources in the subset have a common characteristic.

(B9) In the method of any of B1-B8, further comprising: creating a classification policy that is configured to classify at least some of the resources to have a common classification based at least in part on the extracted metadata indicating that the resources in the common classification have a common characteristic.

(B10) In the method of any of B1-B9, further comprising: creating a business rule that is configured to cause at least a subset of the extracted metadata to be further processed based at least in part on the extracted metadata indicating that the extracted metadata in the subset have a common characteristic.

(B11) In the method of any of B1-B10, wherein selectively extracting the metadata comprises: applying at least one policy to identify a resource that is to be scanned for purposes of metadata extraction; and selectively extracting metadata that is associated with the resource by applying user-defined scan configurations and settings that are applicable to the resource.

(B12) In the method of any of B1-B11, wherein generating the searchable catalog comprises: generating the searchable catalog that further includes hierarchical information, which describes the user-defined hierarchical resource-grouping topology.

(B13) In the method of any of B1-B12, wherein the subset of the hierarchical resource-grouping constructs includes an account hierarchical resource-grouping construct that includes one or more accounts, each account corresponding to a respective portion of the resources that are associated with the hierarchical resource-grouping constructs that are included in the subset.

(C1) An example computer program product (FIG. 8, 818, 822) comprising a computer-readable storage medium having instructions recorded thereon for enabling a processor-based system (FIG. 1, 106A-106N; FIG. 5, 500) to perform operations to perform metadata extraction based on resource attributes and user-defined policy and topology, the operations comprising: registering (FIG. 4, 402) a hierarchical resource-grouping construct, which is selected from a plurality of hierarchical resource-grouping constructs (FIG. 2, 202, 204, 206, 208, 210, 212) in a user-defined hierarchical resource-grouping topology (FIG. 2, 200) of a cloud computing service account, by enumerating at least a subset of the hierarchical resource-grouping constructs, the subset including the selected hierarchical resource-grouping construct and each other hierarchical resource-grouping construct that is encompassed by the selected hierarchical resource-grouping construct; selectively extracting (FIG. 4, 404) metadata from the hierarchical resource-grouping constructs that are included in the subset to provide extracted metadata (FIG. 5, 542) based at least in part on one or more user-defined policies (FIG. 5, 532), which are assigned among the hierarchical resource-grouping constructs that are included in the subset, indicating whether the metadata is to be extracted as a result of resources (FIG. 1, 108) that are associated with the hierarchical resource-grouping constructs that are included in the subset having specified attributes; and generating (FIG. 4, 406) a searchable catalog that includes the extracted metadata.

IV. Example Computer System

FIG. 8 depicts an example computer 800 in which embodiments may be implemented. Any one or more of the user devices 102A-102M and/or any one or more of the servers 106A-106N shown in FIG. 1 and/or computing system 500 shown in FIG. 5 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the topology-based extraction logic 110, the topology-based extraction logic 510, the registration logic 512, the extraction logic 514, the catalog logic 516, the display logic 518, the discovery logic 520, the notification logic 522, the policy creation logic 524, the business rule creation logic 526, the metadata determination logic 762, the scan determination logic 764, the scanning logic 766, flowchart 400 (including any step of flowchart 400), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to perform metadata extraction based on resource attributes and user-defined policy and topology, the system comprising:

memory; and a processing system coupled to the memory, the processing system configured to:

register a selected hierarchical resource-grouping construct, which is selected from a plurality of hierarchical resource-grouping constructs in a user-defined hierarchical resource-grouping topology of a cloud computing service account, by enumerating at least a subset of the hierarchical resource-grouping constructs, the subset including the selected hierarchical resource-grouping construct and an additional hierarchical resource-grouping construct that is encompassed by the selected hierarchical resource-grouping construct;

selectively extract hierarchical resource-grouping constructs that are included in the subset of the hierarchical resource-grouping constructs to provide extracted metadata based at least in part on at least one user-defined policy, which is assigned among the hierarchical resource-grouping constructs that are included in the subset of the hierarchical resource-grouping constructs, indicating whether the metadata is to be extracted as a result of resources that are included in the subset of the hierarchical resource-grouping constructs having specified attributes, wherein selectively extract the metadata from the hierarchical resource-grouping constructs comprises:
- determine that identified metadata that is associated with an identified hierarchical resource-grouping construct that is included in the subset of the hierarchical resource-grouping constructs is to be extracted based at least in part on a user-defined policy indicating that the identified metadata is to be extracted as a result of an identified attribute of a resource that is associated with the identified hierarchical resource-grouping construct satisfying a requirement defined by the user-defined policy;
- determine that a first portion of the identified hierarchical resource-grouping construct was scanned prior to a determination that the identified metadata is to be extracted; and
- scan a second portion of the identified hierarchical resource-grouping construct and not the first portion of the identified hierarchical resource-grouping construct to selectively extract the identified metadata from the identified hierarchical resource-grouping construct based at least in part on determining that the first portion of the identified hierarchical resource-grouping construct was scanned prior to determining that the identified metadata is to be extracted; and generate a searchable catalog that includes the identified metadata.

2. The system of claim 1, wherein a subscription hierarchical resource-grouping construct that is included in the subset of the hierarchical resource-grouping constructs defines a subscription associated with a subset of the resources that are associated with the hierarchical resource-grouping constructs based at least in part on the resources that are included in the subset of the resources having a common characteristic; and
wherein the processing system is configured to:
selectively extract metadata from the subscription hierarchical resource-grouping construct based at least in part on a designated user-defined policy, which is assigned to the subscription hierarchical resource-grouping construct, indicating whether the metadata from the subscription hierarchical resource-grouping construct is to be extracted as a result of an attribute of the resources that are included in the subset of the resources satisfying a requirement defined by the designated user-defined policy.

3. The system of claim 1, wherein a management group hierarchical resource-grouping construct that is included in the subset of the hierarchical resource-grouping constructs defines a management group associated with a subset of the resources that are associated with the hierarchical resource-grouping constructs based at least in part on the resources that are included in the subset of the resources having a common characteristic; and wherein the processing system is configured to:
selectively extract metadata from the management group hierarchical resource-grouping construct based at least in part on a designated user-defined policy, which is assigned to the management group hierarchical resource-grouping construct, indicating whether the metadata from the management group hierarchical resource-grouping construct is to be extracted as a result of an attribute of the resources that are included in the subset of the resources satisfying a requirement defined by the designated user-defined policy.

4. The system of claim 1, wherein the processing system is configured to:
determine that a first aspect of a first user-defined policy, which is assigned to the selected hierarchical resource-grouping construct, conflicts with a second aspect of a second user-defined policy, which is assigned to a second hierarchical resource-grouping construct that is encompassed by the selected hierarchical resource-grouping construct, the at least one user-defined policy including the first user-defined policy and the second user-defined policy; and
implement the second aspect of the second user-defined policy in lieu of the first aspect of the first user-defined policy based at least in part on the second user-defined policy having a priority that is greater than a priority of the first user-defined policy as a result of the second hierarchical resource-grouping construct being encompassed by the selected hierarchical resource-grouping construct.

5. The system of claim 1, wherein the processing system is configured to selectively extract the metadata from the hierarchical resource-grouping constructs by performing operations, the operations comprising:
determine that a designated user-defined policy is assigned to the selected hierarchical resource-grouping construct; and
apply the designated user-defined policy to the selected hierarchical resource-grouping construct and the additional hierarchical resource-grouping construct that is encompassed by the selected hierarchical resource-grouping construct based at least in part on a determination that the designated user-defined policy is assigned to the selected hierarchical resource-grouping construct.

6. The system of claim 1, wherein the processing system is further configured to:
cause a visual representation of the user-defined hierarchical resource-grouping topology of the cloud computing service account and information regarding extraction of the extracted metadata to be displayed on a display of a computing device.

7. The system of claim 1, wherein the processing system is further configured to:
discover a resource that is not specified in the user-defined hierarchical resource-grouping topology of the cloud computing service account and that is capable of being utilized for metadata extraction and access policy; and
notify a user who defined the user-defined hierarchical resource-grouping topology of the cloud computing service account of existence of the resource.

8. The system of claim 1, wherein the processing system is further configured to:
create an access policy that is configured to control access to a designated subset of the resources based at least in part on the extracted metadata indicating that the resources in the designated subset have a common characteristic.

9. The system of claim 1, wherein the processing system is further configured to:
create a classification policy that is configured to classify at least some of the resources to have a common classification based at least in part on the extracted metadata indicating that the resources in the common classification have a common characteristic.

10. The system of claim 1, wherein the processing system is further configured to:
create a business rule that is configured to cause at least a subset of the extracted metadata to be further processed based at least in part on the extracted metadata indicating that the extracted metadata in the subset of the extracted metadata have a common characteristic.

11. The system of claim 1, wherein the processing system is configured to selectively extract the metadata by performing operations, the operations comprising:
apply a policy to identify a resource that is to be scanned for purposes of metadata extraction; and
selectively extract metadata that is associated with the resource by applying user-defined scan configurations and settings that are applicable to the resource.

12. The system of claim 1, wherein the processing system is configured to:
generate the searchable catalog that further includes hierarchical information, which describes the user-defined hierarchical resource-grouping topology.

13. The system of claim 1, wherein the subset of the hierarchical resource-grouping constructs includes an account hierarchical resource-grouping construct that includes accounts corresponding to respective portions of the resources that are associated with the hierarchical resource-grouping constructs that are included in the subset of the hierarchical resource-grouping constructs.

14. A method of performing metadata extraction based on resource attributes and user-defined policy and topology, the method implemented by a computing system, the method comprising:
registering a selected hierarchical resource-grouping construct, which is selected from a plurality of hierarchical resource-grouping constructs in a user-defined hierarchical resource-grouping topology of a cloud computing service account, by enumerating at least a subset of the hierarchical resource-grouping constructs, the subset including the selected hierarchical resource-grouping construct and an additional hierarchical resource-grouping construct that is encompassed by the selected hierarchical resource-grouping construct;
selectively extracting metadata from the hierarchical resource-grouping constructs that are included in the subset to provide extracted metadata based at least in part on at least one user-defined policy, which are assigned among the hierarchical resource-grouping constructs that are included in the subset, indicating whether the metadata is to be extracted as a result of resources that are associated with the hierarchical resource-grouping constructs that are included in the subset having specified attributes;
generating a searchable catalog that includes the extracted metadata;
discovering a resource that is not specified in the user-defined hierarchical resource-grouping topology of the cloud computing service account and that is capable of being utilized for metadata extraction and access policy; and
notifying a user who defined the user-defined hierarchical resource-grouping topology of the cloud computing service account of existence of the discovered resource.

15. The method of claim 14, wherein a subscription hierarchical resource-grouping construct that is included in the subset of the hierarchical resource-grouping constructs defines a subscription associated with a subset of the resources that are associated with the hierarchical resource-grouping constructs based at least in part on the resources that are included in the subset of the resources having a common characteristic; and
wherein selectively extracting the metadata comprises:
selectively extracting metadata from the subscription hierarchical resource-grouping construct based at least in part on a user-defined policy, which is assigned to the subscription hierarchical resource-grouping construct, indicating whether the metadata from the subscription hierarchical resource-grouping construct is to be extracted as a result of an attribute of the resources that are included in the subset of the resources satisfying a requirement defined by the user-defined policy.

16. The method of claim 14, wherein a management group hierarchical resource-grouping construct that is included in the subset of the hierarchical resource-grouping constructs defines a management group associated with a subset of the resources that are associated with the hierarchical resource-grouping constructs based at least in part on the resources that are included in the subset of the resources having a common characteristic; and
wherein selectively extracting the metadata comprises:
selectively extracting metadata from the management group hierarchical resource-grouping construct based at least in part on a user-defined policy, which is assigned to the management group hierarchical resource-grouping construct, indicating whether the metadata from the management group hierarchical resource-grouping construct is to be extracted as a result of an attribute of the resources that are included in the subset of the resources satisfying a requirement defined by the user-defined policy.

17. The method of claim 14, wherein selectively extracting the metadata comprises:
determining that a user-defined policy is assigned to the selected hierarchical resource-grouping construct; and
applying the user-defined policy to the selected hierarchical resource-grouping construct and the additional hierarchical resource-grouping construct that is encompassed by the selected hierarchical resource-grouping construct based at least in part on a determination that the user-defined policy is assigned to the selected hierarchical resource-grouping construct.

18. The method of claim 14, wherein selectively extracting the metadata comprises:
determining that identified metadata that is associated with an identified hierarchical resource-grouping construct that is included in the subset of the hierarchical resource-grouping constructs is to be extracted based at least in part on a user-defined policy indicating that the identified metadata is to be extracted as a result of an attribute of an identified resource that is associated with the identified hierarchical resource-grouping construct satisfying a requirement defined by the user-defined policy;

determining that a first portion of the identified hierarchical resource-grouping construct was scanned prior to determining that the identified metadata is to be extracted; and scanning a second portion of the identified hierarchical resource-grouping construct and not the first portion of the identified hierarchical resource-grouping construct to selectively extract the identified metadata from the identified hierarchical resource-grouping construct based at least in part on determining that the first portion of the identified hierarchical resource-grouping construct was scanned prior to determining that the identified metadata is to be extracted.

19. The method of claim 14, wherein generating the searchable catalog comprises:

generating the searchable catalog that further includes hierarchical information, which describes the user-defined hierarchical resource-grouping topology.

20. A computer program product comprising a computer-readable storage medium having instructions recorded thereon for enabling a processor-based system to perform operations to perform metadata extraction based on resource attributes and user-defined policy and topology, the operations comprising:

registering a selected hierarchical resource-grouping construct, which is selected from a plurality of hierarchical resource-grouping constructs in a user-defined hierarchical resource-grouping topology of a cloud computing service account, by enumerating at least a subset of the hierarchical resource-grouping constructs, the subset including the selected hierarchical resource-grouping construct and an additional hierarchical resource-grouping construct that is encompassed by the selected hierarchical resource-grouping construct;

selectively extracting metadata from the hierarchical resource-grouping constructs that are included in the subset to provide extracted metadata based at least in part on user-defined policies, which are assigned among the hierarchical resource-grouping constructs that are included in the subset, indicating whether the metadata is to be extracted as a result of resources that are associated with the hierarchical resource-grouping constructs that are included in the subset having specified attributes;

generating a searchable catalog that includes the extracted metadata;

discovering a resource that is not specified in the user-defined hierarchical resource-grouping topology of the cloud computing service account and that is capable of being utilized for metadata extraction and access policy; and notifying a user who defined the user-defined hierarchical resource-grouping topology of the cloud computing service account of existence of the discovered resource.

* * * * *